(12) United States Patent
Ma

(10) Patent No.: US 9,927,640 B2
(45) Date of Patent: Mar. 27, 2018

(54) DISPLAY DEVICE COMPRISING VISUAL ANGLE ADJUSTMENT PANEL AND DISPLAY METHOD THEREOF

(71) Applicant: BOE TECHNOLOGY GROUP CO., LTD., Beijing (CN)

(72) Inventor: Xinli Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/104,944

(22) PCT Filed: Sep. 25, 2015

(86) PCT No.: PCT/CN2015/090696
§ 371 (c)(1),
(2) Date: Jun. 15, 2016

(87) PCT Pub. No.: WO2016/197486
PCT Pub. Date: Dec. 15, 2016

(65) Prior Publication Data
US 2017/0139243 A1 May 18, 2017

(30) Foreign Application Priority Data

Jun. 10, 2015 (CN) .......................... 2015 1 0317005

(51) Int. Cl.
*G09G 5/00* (2006.01)
*G02F 1/13* (2006.01)
(Continued)

(52) U.S. Cl.
CPC ........ *G02F 1/1323* (2013.01); *G02F 1/13306* (2013.01); *G02F 1/13439* (2013.01);
(Continued)

(58) Field of Classification Search
CPC ........ G09G 3/003; G09G 3/36; G02F 1/1323; G02F 1/134309; G02F 1/13439; G02F 1/13306
(Continued)

(56) References Cited

U.S. PATENT DOCUMENTS 5,825,436 A  10/1998 Knight
7,626,656 B2  12/2009 Jang et al.
(Continued)

FOREIGN PATENT DOCUMENTS

CN  101004871 A  7/2007
CN  101916014 A  12/2010
(Continued)

OTHER PUBLICATIONS

International Search Report and Written Opinion from PCT Application Serial No. PCT/CN2015/090696, dated Jan. 15, 2016, 13 pages.
(Continued)

*Primary Examiner* — Adam J Snyder
(74) *Attorney, Agent, or Firm* — Kinney & Lange, P.A.

(57) ABSTRACT

The present disclosure provides a display device and a display method, relates to a field of display technology, and improves user's poor experiences in the existing anti-peeping display device. A display device includes: a display panel; a visual angle adjustment panel provided on an exit side of the display panel, the panel including at least one first region in strip shape and at least one second region in strip shape, the first region and the second region being alternately arranged relative to each other; and a control device connected to the panel, wherein the control device is configured to control the panel such that the first region and the second region are transmissive upon receipt of a first instruction and to control the panel such that the first region is
(Continued)

opaque and the second region is transmissive upon receipt of a second instruction.

12 Claims, 2 Drawing Sheets

(51) Int. Cl.
*G02F 1/1343* (2006.01)
*G02F 1/133* (2006.01)
*G09G 3/36* (2006.01)

(52) U.S. Cl.
CPC ......... *G02F 1/134309* (2013.01); *G09G 3/36* (2013.01); *G09G 2354/00* (2013.01)

(58) Field of Classification Search
USPC .............................................................. 345/4
See application file for complete search history.

(56) References Cited

U.S. PATENT DOCUMENTS

| | | | |
|---|---|---|---|
| 2003/0007227 A1 | 1/2003 | Ogino | |
| 2005/0286000 A1 | 12/2005 | Tsai et al. | |
| 2006/0145976 A1* | 7/2006 | Tsai | G09G 3/36 345/87 |
| 2008/0218459 A1 | 9/2008 | Kim et al. | |
| 2010/0085513 A1 | 4/2010 | Chiba et al. | |
| 2010/0090928 A1* | 4/2010 | Maeda | G09G 3/3611 345/4 |
| 2012/0127286 A1* | 5/2012 | Sato | H04N 13/0029 348/54 |
| 2012/0162551 A1* | 6/2012 | Sato | H04N 13/0409 349/15 |
| 2012/0229429 A1* | 9/2012 | Inoue | H04N 13/0413 345/204 |
| 2012/0229442 A1* | 9/2012 | Inoue | G09G 3/003 345/212 |
| 2013/0076724 A1* | 3/2013 | Park | G09G 3/003 345/212 |
| 2014/0063386 A1* | 3/2014 | Yang | G09G 3/36 349/33 |
| 2015/0193625 A1* | 7/2015 | Sumi | G09G 3/003 345/697 |

FOREIGN PATENT DOCUMENTS

| | | |
|---|---|---|
| CN | 102768409 A | 11/2012 |
| CN | 103091883 A | 5/2013 |
| CN | 104090417 A | 10/2014 |
| CN | 104851394 A | 8/2015 |
| KR | 20070003181 A | 1/2007 |

OTHER PUBLICATIONS

First Chinese Office Action, for Chinese Patent Application No. 2015103170051, dated Dec. 23, 2016, 17 pages.
Second Chinese Office Action, for Chinese Patent Application No. 201510317005.1, dated May 26, 2017, 15 pages.
Third Chinese Office Action, for Chinese Patent Application No. 201510317005.1, dated Aug. 31, 2017, 6 pages.

* cited by examiner

DISPLAY DEVICE COMPRISING VISUAL ANGLE ADJUSTMENT PANEL AND DISPLAY METHOD THEREOF

CROSS-REFERENCE TO RELATED APPLICATIONS

This application is a National Stage application of International Application No. PCT/CN2015/090696, filed on Sep. 25, 2015, entitled "Display Device and Display Method", which claims priority to Chinese Application No. 201510317005.1, filed on Jun. 10, 2015, entitled "a display device and display method", and the above applications are incorporated herein by reference in their entirety.

TECHNICAL FIELD

The present disclosure relates to a field of display technology, and more particularly to a display device and a display method.

BACKGROUND

A mobile display device has been widely used in daily lives. However, when the user is in a public place, the contents displayed by the display device will inevitably be seen by other people. In the prior art, this problem is generally solved by mounting an anti-peeping film on the display device. The anti-peeping film generally includes a plurality of light-shielding strips, reducing the visual angle of the display device. The user can see the displayed contents within a certain range of visual angles and other persons can not see the displayed contents out of the certain range of visual angles.

But when the user wants to share the displayed contents with one or more persons, it may be necessary for the display device to display in a large visual angle. And at this time, it may be necessary to remove the anti-peeping film.

Thus, in order to meet different requirements of the user for large and small visual angles, the anti-peeping film has to be repeatedly torn down and pasted, which will result in not only a poor user experience, but also a residue of an adhesive when the film is torn down, resulting in a damage to the screen of the display device.

SUMMARY

An embodiment of the present invention provides a display device and a display method. The user can adjust a size of a visual angle of the display device by means of control instructions so as to meet different requirements.

To achieve the above object, an embodiment of the present invention employs the following technical solution:

In one aspect, an embodiment of the invention provides a display device including:

a display panel;

a viewing angle adjustment panel provided on an exit side of the display panel, the visual angle adjustment panel including at least one first region in strip shape and at least one second region in strip shape, the first region and the second region being alternately arranged relative to each other: and a control device connected to the visual angle adjusting panel, wherein the control device is configured to control the first region and the second region of the visual angle adjustment panel to be transmissive upon receipt of a first instruction and to control the first region of the visual angle adjustment panel to be opaque and the second region to be transmissive upon receipt of a second instruction.

In another aspect, an embodiment of the invention provides a display method for the above display device including:

driving the display panel to display an image:

receiving a first instruction to control the first and second regions of the visual angle adjustment panel to be transmissive and receiving a second instruction to control the first region of the visual angle adjustment panel to be opaque and the second region to be transmissive.

An embodiment of the invention provides a display device and a display method. The display device includes a display panel and a visual angle adjustment panel. According to the requirements, the user can trigger the first instruction or the second instruction, such that the control device controls the first and second regions of the visual angle adjustment panel to be transmissive upon receipt of the first instruction to obtain a normal display (large visual angle) mode of the display device, and such that the control device controls the first region of the visual angle adjustment panel to be opaque and the second region to be transmissive upon receipt of the second instruction to cause the adjustment panel to form a grating, thereby reducing the visual angle of the display panel and obtaining an anti-peeping display mode.

BRIEF DESCRIPTION OF THE DRAWINGS

In order to more clearly illustrate solutions in embodiments of the invention, the drawings that will be used in describing the embodiments will be explained below. Apparently, the following description to the drawings are only some embodiments of the invention, and those with ordinary skills in the art can further obtain other drawings based on these drawings without creative efforts.

DETAILED DESCRIPTION OF EMBODIMENTS

The solutions in embodiments of the invention will be now clearly and completely described with reference to the drawings in the embodiments of the invention. Apparently, the described embodiments are only some embodiments of the invention, rather than all of the embodiments. Those with ordinary skills in the art can further obtain other embodiments that fall within the protection scope of the invention based on the embodiments of the invention without creative efforts.

Figure 1:
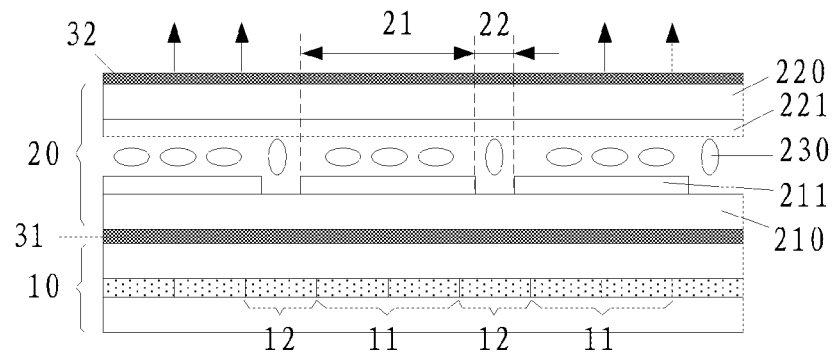
FIG. 1 is a schematic view of a display device according to an embodiment of the present invention.

An embodiment of the present invention provides a display device, as shown in FIG. 1, including:

a display panel 10;

a visual angle adjustment panel 20 provided on an exit side of the display panel 10, the visual angle adjustment panel 20 including at least one first region 21 in strip shape and at least one second region 22 in strip shape, the first region 21 and the second region 22 being alternately arranged relative to each other, and a control device (not shown in figures) connected to the visual angle adjusting panel, wherein the control device is configured to control the visual angle adjustment panel 20 such that the first region 21 and the second region 22 are transmissive upon receipt of a first instruction and to control the visual angle adjustment panel 20 such that the first region 21 is opaque and the second region 22 is transmissive upon receipt of a second instruction.

In particular, the control device may be a control chip. The first instruction may be a normal (large visual angle) display instruction, and the second instruction may be an anti-peeping (small visual angle) display instruction. The user may set options in an interface to select the first instruction or second instruction, so as to regulate the control device to receive the first instruction and the second instruction. The control device controls light transmittance of the first region and the second region of the visual angle adjustment panel according to the instruction selected by the user.

If both of the first region and the second region of the visual angle adjustment panel are transmissive, the display device may be in a normal display mode. If the first region of the visual angle adjustment panel is opaque and the second region is transmissive, the visual angle adjustment panel will form a grating such that the visual angle of the display panel can be adjusted, thus achieving an anti-peeping display mode. That is to say, the embodiment of the invention provides a display device in which according to the different instructions received, the visual angle adjustment panel can be controlled to be transmissive or form the grating such that the visual angle of the display panel can be adjusted, thus achieving the function of switching freely between a normal display mode and an anti-peeping display mode.

Figure 2:
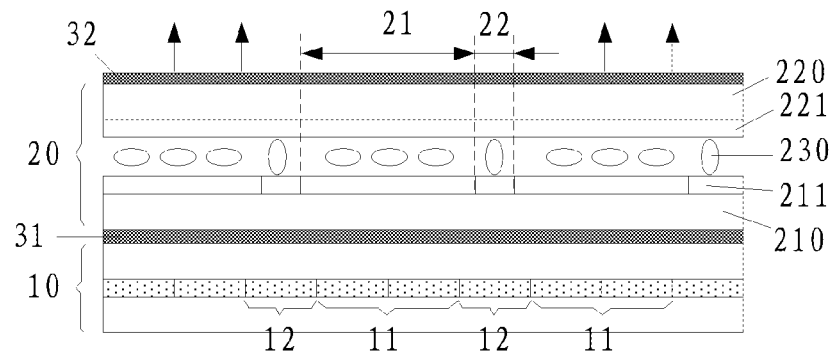
FIG. 2 is a schematic view of a display device according to another embodiment of the present invention.

Alternatively, as shown in FIG. 1 and FIG. 2, the visual angle adjustment panel 20 is a liquid crystal panel. The liquid crystal panel includes a plurality of first regions 21 in strip shape and a plurality of second regions in strip shape that are alternately spaced relative to each other. In the liquid crystal panel shown in FIG. 1, the light transmittance of the first regions 21 is adjustable; and in the liquid crystal panel shown in FIG. 2, both the light transmittance of the first regions 21 and the light transmittance of the second regions 22 are adjustable.

In particular, if the light transmittance of the first regions is adjustable, in the case that the second regions are non-adjustable transmissive regions, the liquid crystal panel can be adjusted such that the first regions are opaque regions to form a grating. If both of the light transmittance of the first regions and the light transmittance of the second regions are adjustable, the liquid crystal panel can be adjusted such that the first regions are opaque regions and the second regions are transmissive regions to form a grating; alternatively, the liquid crystal panel can be adjusted such that the first regions are transmissive regions and the second regions are opaque regions to form a grating.

It should be noted that, in the embodiment of the invention, the specific positions corresponding to the first and second regions are not limited, but described by means of the example illustrated in the drawings. For example, the positions of the first and second regions in FIG. 1 and FIG. 2 may also be interchanged.

Preferably, the liquid crystal panel is in a normally white mode. Normally white mode means that the liquid crystal panel is transmissive when no voltage is applied to the liquid crystal panel so that the display device can obtain a normal display mode. When an anti-peeping display mode is required to be obtained, the liquid crystal display panel is switched to the second state and at this time a voltage is applied to the liquid crystal panel. Since the user only needs a normal display mode in most cases, the normally white mode is more conducive to saving of electric power.

Alternatively, the width of the first region and the width of the second region are non-adjustable.

Figure 3:
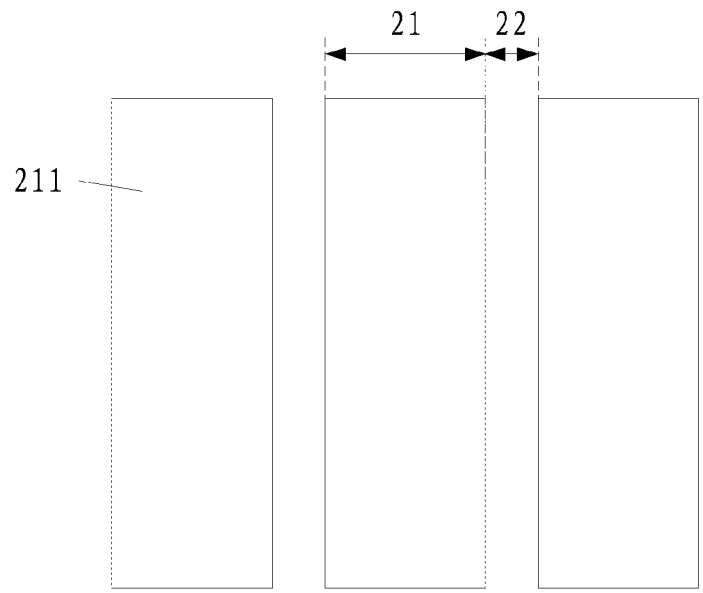
FIG. 3 is a schematic view of a first electrode corresponding to the display device shown in FIG. 1.

In particular, as shown in FIG. 1 and FIG. 3, the liquid crystal panel (visual angle adjustment panel 20) includes: a first substrate 210; a second substrate 220; a first electrode 211 and a second electrode 221 that are disposed on the first substrate 210 and the second substrate 220, respectively; and liquid crystal positioned between the first substrate 210 and the second substrate 220;

wherein the first electrode 211 is a electrode in strip shape which corresponds to the first region 21, and the second electrode 221 is a planar electrode which corresponds to the first region 21 and the second region 22.

An operating principle of the liquid crystal panel is similar to that of the liquid crystal display. That is, in the case that a voltage is applied to the first electrode and the second electrode at the same time, the first and second electrodes form an electric field so that the liquid crystal is driven to deflect, changing the light transmittance. If the first electrode corresponds to the first region, the light transmittance of the first region is adjustable and the light transmittance of the second region is non-adjustable. In the case that the second region is a transmissive region, the liquid crystal panel can be adjusted such that the first region is an opaque region to form a grating.

In the case that the first electrode corresponds to the first region, the first electrode may have a same strip shape as the first region, and the width of the first region is equal to the width of the first electrode.

Alternatively, the width of the first region and the width of the second region are adjustable.

Figure 4:
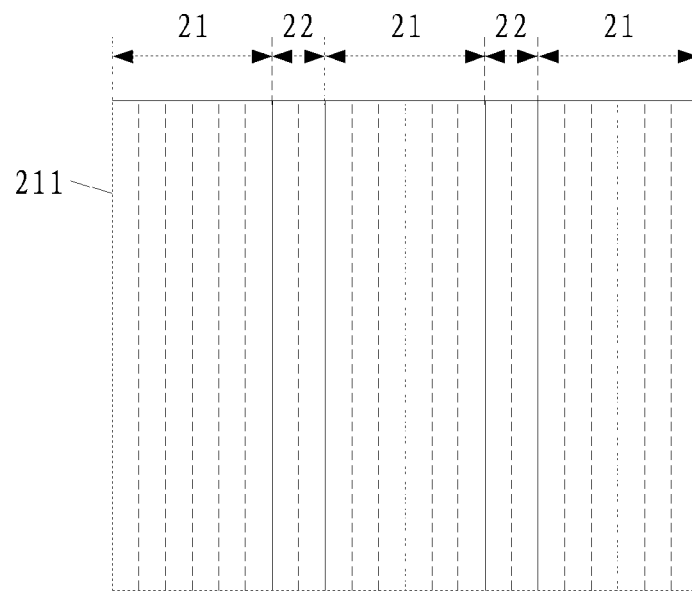
FIG. 4 is a schematic view of a first electrode corresponding to the display device shown in FIG. 2.

In particular, as shown in FIG. 2 and FIG. 4, the liquid crystal panel includes: a first substrate 210; a second substrate 220; a first electrode 211 and a second electrode 221 that are disposed on the first substrate 210 and the second substrate 220, respectively; and liquid crystal 230 positioned between the first substrate 210 and the second substrate 220;

wherein the first electrode 211 includes a plurality of rows of unit electrodes, and at least one row of unit electrodes corresponds to the first region, and wherein the second electrode 221 is a planar electrode which corresponds to the first region 21 and the second region 22. As shown in FIG. 4, each of the first regions 21 corresponds to six rows of unit electrode, and each of the second regions 22 corresponds to two rows of unit electrodes. One row of unit electrode may include one stripped electrode or a plurality of sub-unit electrodes. In particular, in the case that one row of unit electrode includes a plurality of sub-unit electrodes, the sub-unit electrodes may be pixel electrodes, such as those in a liquid crystal display panel, which are formed in a plurality of rows and columns.

In particular, an operating principle of the liquid crystal panel is similar to that of the liquid crystal display. That is, in the case that a voltage is applied to the first electrode and the second electrode at the same time, the first and second electrodes form an electric field so that the liquid crystal is driven to deflect, changing the light transmittance. The width of the first region and the width of the second region can be changed by applying a voltage to different rows of unit electrodes so as to drive the crystal corresponding to different rows of unit electrodes to deflect. With regard to the signal driving of the liquid crystal grating controlling the first electrode and the second electrode, reference is made to the driving of the existing liquid crystal display, and the driving will not be repeated here.

Alternatively, as shown in FIG. 1 and FIG. 2, the display panel 10 includes a plurality of pixel groups that are alternately arranged, each pixel group includes at least one pixel, and two adjacent pixel groups are referred to as a first pixel group 11 and a second pixel group 12, respectively. The first pixel group 11 and the second pixel group 12 are alternately arranged. The second region 22 corresponds to the second pixel group 12, and the width of the second region 22 is smaller than the sum of the widths of respective pixels in the second pixel group 12.

A pixel group includes at least one pixel. That is, the first pixel group includes at least one pixel, the second pixel group includes at least one pixel, and the number of pixels contained in the first pixel group and the second pixel group may be the same or different. The number of pixels contained in the first pixel group and the second pixel group is not specifically limited in the disclosure. As shown in FIG. 1 and FIG. 2, an embodiment of the invention in which the first pixel group 11 includes two pixels and the second pixel group 12 includes one pixel is described in detail as an example. It should be noted that a pixel includes a multilayer film and a layer structure formed on the display panel. In the embodiment of the invention, pixel groups and pixels are only illustratively described.

Figure 6:
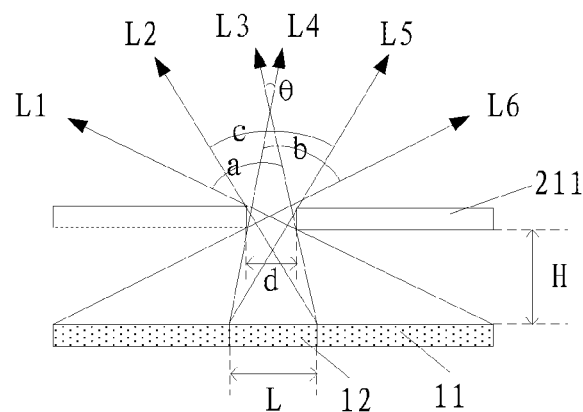
FIG. 6 is a schematic view of an optical path of a display device according to an embodiment of the present invention.

Preferably, as shown in FIG. 6, the sum of the widths of respective pixels in the second pixel group is L, the width of the second region is d, a distance from the first electrode to an exit side of the display panel is H, the first electrode is formed on the first substrate, the light transmittance of the first substrate is n, the visual angle range of the second pixel group is θ, and then the display device meets to the following relationship:

$$\theta = 2 \times \arcsin\left(n \times \sin\left(\arctan\left(\frac{L-d}{2H}\right)\right)\right).$$

Referring to FIG. 6, the second pixel group 12 includes one pixel, and thus the width of the second pixel group is equal to the width of one pixel and is L. The width of the second region is d, the distance from the first electrode 211 to the exit side of the display panel (which shown in FIG. 6 is only an example) is H. As shown in FIG. 6, in the field of view above the second region, original visual angle ranges of two first pixel groups 11 are a visual angle a formed by L1 and L3 and a visual angle b formed by L4 and L6; and an original visual angle range of the second pixel groups is a visual angle c formed by L2 and L5. Due to an overlapping region of the visual angle a and the visual angle c and an overlapping region of the visual angle b and the visual angle c, images displayed by the first pixel group and the second pixel group will mix, which results in a non-normal display region. Thus, the visual angle range of the second pixel group is only a visual angle θ formed by L3 and L4, and the visual angle ranges of the first pixel group are a visual angle formed by L1 and L2 as well as a visual angle formed by L5 and L6.

After the formation of the display device, in the above equation, the sum of the widths of respective pixels in the second pixel group is L, the distance from the first electrode to the exit side of the display panel is H, the light transmittance of the first substrate n is a constant, and therefore in an embodiment of the present invention, the visual angle range of the second pixel group can be adjusted by adjusting the width of the second region to be d. Preferably, the visual angle range of the second pixel group is: 10°≤θ≤30°.

Alternatively, the display panel is an organic light emitting diode display panel or a liquid crystal display panel. As shown in FIG. 1 and FIG. 2, if the display panel is an organic light emitting diode, since the light emitted from the organic light emitting diode display panel is not a polarized light, a first polarizing sheet 31 will be formed on a side of the first substrate 210 away from the liquid crystal 230 and a second polarizing sheet 32 will be formed on a side of the second substrate 220 away from the liquid crystal 230. A light transmissive axis of the first polarizing sheet 31 and a light transmissive axis of the second polarizing sheet 32 are perpendicular to each other.

Figure 5:
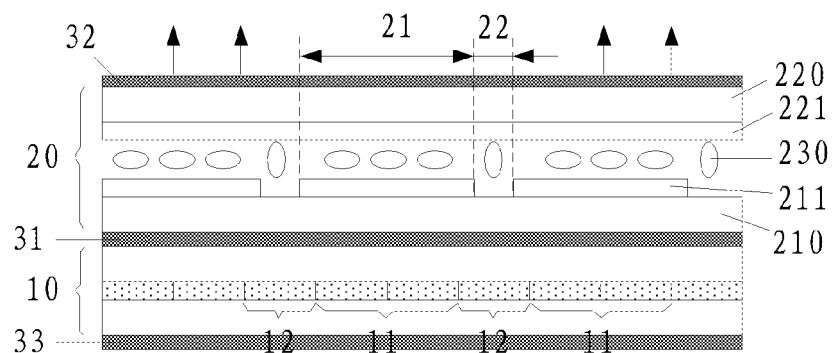
FIG. 5 is a schematic view of a display device according to another embodiment of the present invention.

If the display panel is a liquid crystal display panel, as shown in FIG. 5, a third polarizing sheet 33 is formed on a side of the liquid crystal display panel away from the visual angle adjustment panel 20. A light transmissive axis of the third polarizing sheet 33 and the light transmissive axis of the second polarizing sheet 32 are perpendicular to each other.

Further, since the liquid crystal display panel can not emit light, a backlight source may be necessary to achieve a display function, and thus the display device further includes a backlight source. The light emitted from the backlight source forms a polarized light by passing it through the third polarizing sheet, goes into the liquid crystal display panel, and then is emitted out through the first polarizing sheet.

It should be noted that, in the embodiment of the invention, the purpose of providing the light transmissive axes of the polarizing sheets to be perpendicular to each other is mainly to achieve switching between a transmissive mode and an opaque mode. However, actually, for the different display modes, a relative orientation of the light transmissive axes may be different, and here the light transmissive axes perpendicular to each other are only for the normally white mode. In fact, if a TN-type liquid crystal panel is employed, the light transmissive axes of the two polarizing sheets can be parallel to each other, and in this case, a normally black mode will be obtained.

An embodiment of the invention provides a display method for a display device, including:

a step 101 in which the display panel is driven to display an image, wherein at this time, the display panel may be in a normal display mode; and a step 102 in which a first instruction is received and the first and second regions of the visual angle adjustment panel are controlled to be transmissive, or a second instruction is received and the first region of the visual angle adjustment panel is controlled to be opaque and the second region is controlled to be transmissive.

Alternatively, the visual angle adjustment panel is a liquid crystal panel, and the operating principle of the liquid crystal panel is similar to that of a liquid crystal display. That is, in the case that a voltage is applied to the first electrode and the second electrode at the same time, the first and second electrodes form an electric field so that the liquid crystal is driven to deflect, changing the light transmittance. Upon receipt of the first instruction or the second instruction, the controlling driver controls the voltage signal of the first electrode and the second electrode disposed on the visual angle adjustment panel such that the first and second regions are transmissive, respectively, or such that the first regions are opaque and the second regions are transmissive so as to form a grating.

Taking the embodiment in which the liquid crystal grating in the display device shown in FIG. 1 is a normally white mode as an example, in the case that no voltage is applied to the first electrode 211 and the second electrode 221, both of the first and second regions are transmissive. A voltage is applied to the first electrode 211 and the second electrode 221, respectively, such that the liquid crystal 230 corresponding to the first region 21 is driven by the electric field to cause the first region to be opaque; and such that the liquid crystal 230 corresponding to the second region 22 is not driven by the electric field, causing the second region 22 to be transmissive, and such that the grating is formed in the visual angle adjustment panel.

Taking the embodiment in which the liquid crystal grating in the display device shown in FIG. 2 is a normally white mode as an example again, in the case that no voltage is applied to the first electrode 211 and the second electrode 221, both of the first and second regions are transmissive. A voltage is applied to the first electrode 211 and the second electrode 221, respectively, wherein the voltage is applied to the unit electrodes in the first electrode 211 that corresponds to the first region 21 such that the liquid crystal 230 corresponding to the first region 21 is driven by the electric field to cause the first region to be opaque; and wherein no voltage is applied to the unit electrodes in the first electrode 211 that corresponds to the second region 22 such that the liquid crystal 230 corresponding to the second region 22 is not driven by the electric field, causing the second region 22 to be transmissive, and such that the grating is formed in the visual angle adjustment panel.

It can be appreciated by a person skilled in the art that, when a voltage that is too small to cause the liquid crystal 230 to deflect is applied to the first electrode 211 and the second electrode 221, the light transmittance of the first region 21 can also be effected.

With regard to the signal driving of the liquid crystal grating controlling the first electrode and the second electrode, reference is made to the driving of the existing liquid crystal display, and the driving will not be repeated here.

Preferably, the display panel includes at least two pixel groups that are alternately arranged, each pixel group including at least one pixel, two adjacent pixel groups of the at least two pixel groups are referred to as a first pixel group and a second pixel group respectively. Driving the display panel to display an image in particular includes:

driving a first pixel group to display a first image, and driving the second pixel group to display a second image.

The display panel enables dual image display. For example, the first image may be a word document, and the second image may be a video. In the second state of the dual image display, the user can view the word document, and other people around can view the video.

The above is only a specific embodiment of the present invention, and the scope of the present disclosure is not limited thereto. Any skilled in the art can easily envisage of any other modifications or alternatives that will fall within the scope of the present disclosure. Accordingly, the scope of the present invention should be defined by the appended claims.

REFERENCE NUMBER

10—display panel
11—first pixel group
12—second pixel group
20—visual angle adjustment panel
21—first region
22—second region
31—first polarizing sheet
32—second polarizing sheet
33—third polarizing sheet
210—first substrate
211—first electrode
220—second substrate
221—second electrode
230—liquid crystal

What is claimed is:

1. A display device, comprising:
a display panel;
a visual angle adjustment panel provided on an exit side of the display panel, the visual angle adjustment panel comprising at least one first region in strip shape and at least one second region in strip shape, the first region and the second region being alternately arranged relative to each other; and
a control device connected to the visual angle adjusting panel, wherein the control device is configured to control the visual angle adjustment panel such that the first region and the second region are transmissive upon receipt of a first instruction and to control the visual angle adjustment panel such that the first region is opaque and the second region is transmissive upon receipt of a second instruction,
wherein the display panel comprises at least two pixel groups that are alternately arranged, each pixel group of the at least two pixel groups comprises at least one pixel, and two adjacent pixel croups are referred to as a first pixel group and a second pixel group, respectively,
wherein the second region corresponds to the second pixel group, and a width of the second region is smaller than the sum of widths of respective pixels in the second pixel group, and
wherein the sum of the widths of respective pixels in the second pixel group is L, the width of the second region is d, a distance from the first electrode to an exit side of the display panel is H, the first electrode is formed on the first substrate, the light transmittance of the first substrate is n, a visual angle range of the second pixel group is θ, and the display device meets the following relationship:

$$\theta = 2 \times \arcsin\left(n \times \sin\left(\arctan\left(\frac{L-d}{2H}\right)\right)\right).$$

2. The display device according to claim 1, wherein the visual angle adjustment panel is a liquid crystal panel.

3. The display device according to claim 2, wherein the liquid crystal panel comprising:
a first substrate;
a second substrate;
a first electrode and a second electrode that are disposed on the first substrate and the second substrate, respectively; and
liquid crystal positioned between the first substrate and the second substrate;
wherein the first electrode is an electrode in strip shape which corresponds to the first region, and the second electrode is a planar electrode which corresponds to the first region and the second region.

4. The display device according to claim 3, wherein the first pixel group comprises two pixels and the second pixel group comprises one pixel.

5. The display device according to claim 3, wherein the visual angle range is: 10°<θ<30°.

6. The display device according to claim 2, wherein the liquid crystal panel comprising:
   a first substrate;
   a second substrate;
   a first electrode and a second electrode that are disposed on the first substrate and the second substrate, respectively; and
   liquid crystal positioned between the first substrate and the second substrate;
   wherein the first electrode comprises a plurality of rows of unit electrodes, and at least one row of unit electrodes corresponds to the first region; and
   wherein the second electrode is a planar electrode which corresponds to the first region and the second region.

7. The display device according to claim 2, wherein the first pixel group comprises two pixels and the second pixel group comprises one pixel.

8. The display device according to claim 2, wherein the visual angle range is 10°<θ<30°.

9. The display device according to claim 1, wherein the first pixel group comprises two pixels and the second pixel group comprises one pixel.

10. The display device according to claim 1, wherein the visual angle range is: 10°≤θ≤30°.

11. A display method for the display device according to claim 1, comprising:
    driving the display panel to display an image;
    receiving a first instruction to control the visual angle adjustment panel such that the first region and the second region are transmissive, or receiving a second instruction to control the visual angle adjustment panel such that the first region is opaque and the second region is transmissive.

12. The display method according to claim 11, wherein driving the display panel to display an image comprising:
    driving a first pixel group to display a first image, and driving the second pixel group to display a second image.

* * * * *

UNITED STATES PATENT AND TRADEMARK OFFICE
CERTIFICATE OF CORRECTION

PATENT NO. : 9,927,640 B2
APPLICATION NO. : 15/104944
DATED : March 27, 2018
INVENTOR(S) : Xinli Ma Page 1 of 1

It is certified that error appears in the above-identified patent and that said Letters Patent is hereby corrected as shown below:

Column 8, Line 32 in Claim 1:
Delete "croup"
Insert --group--

Signed and Sealed this
Fifth Day of June, 2018

Andrei Iancu
*Director of the United States Patent and Trademark Office*